May 8, 1962
C. H. WEBER
3,033,488
TAKE-UP REEL
Filed April 24, 1961
2 Sheets-Sheet 1
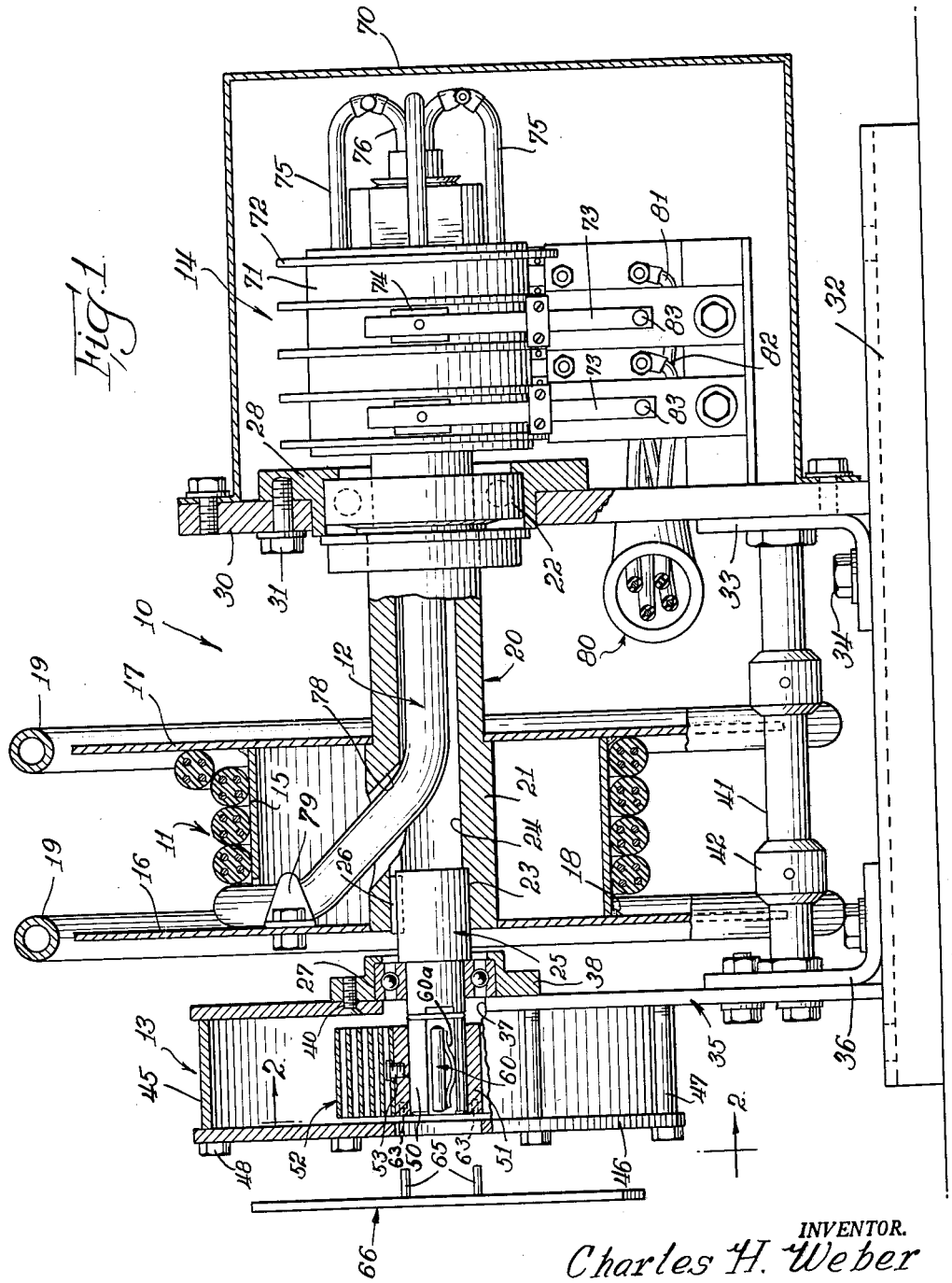
INVENTOR.
Charles H. Weber
BY
Horton, Davis, Brewer & Brugman
attys.

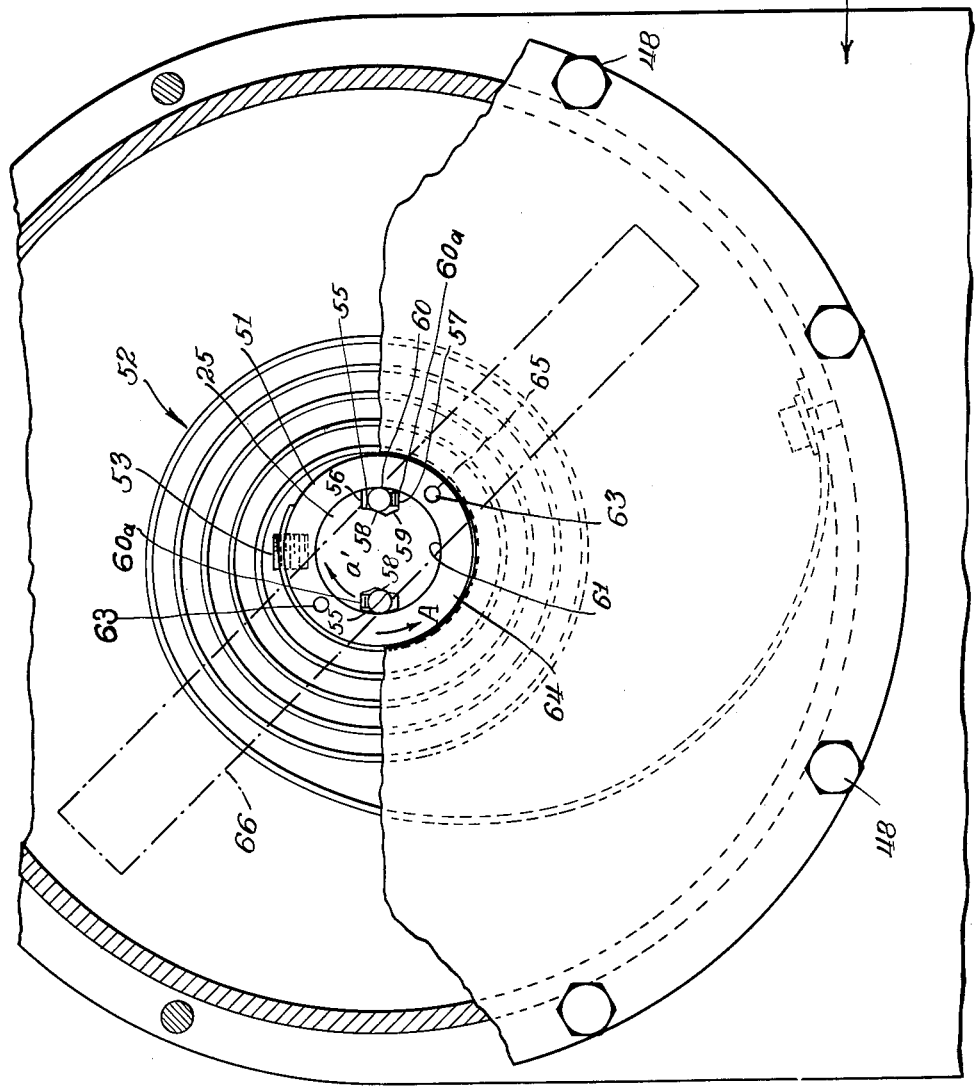

United States Patent Office 3,033,488
Patented May 8, 1962

3,033,488
TAKE-UP REEL
Charles H. Weber, Mayville, Wis., assignor to Gleason
Reel Corp., Milwaukee, Wis., a corporation of Wisconsin
Filed Apr. 24, 1961, Ser. No. 104,907
4 Claims. (Cl. 242—107.5)

This invention relates generally to automatic take-up reels and more especially to improvements in spring-powered take-up means therefor.

Storage reels having means for automatically tensioning and retrieving electric cable, cord, rope, hose and like items are well known in the art. In handling electric cable, such reels additionally include slip ring and brush collector means for transmitting electrical energy to the reeled cable. Electrical cable storage reels of this type are commonly used on many types of traveling, electrically powered equipment, such as mobile crane hoists and the like, where it is essential to pay out and retrieve power cable to accommodate a wide range of travel for the equipment. Reels for this general purpose usually have spring powered take-up means which periodically require tensioning adjustment of the spring system thereof in order to maintain desired cable tension and cable retrieving action. Tensioning of the spring means is also encountered at initial or replacement installation of the spring system. While it is possible to install pre-tensioned or pre-wound spring means, such an operation is generally difficult, and subjects the installing personnel to the dangers of accidental release of the tensioned spring. Consequently, it has become general practice, when increasing spring tension in take-up means of this type, to disconnect one end of the cable from the motorized equipment so that the cable may be manually wrapped around the drum or reel and the latter rotated to appropriately tension the spring. When a desired spring tension has been achieved by this method, the free end of the cable is then reattached to the motorized equipment. This procedure is not only time-consuming and cumbersome, but is inaccurate in regulating cable tension. Further, this practice subjects the operator to the dangers of accidental release of the tensioning drum while the cable is free at one end. Additionally, physical limitations of the particular equipment and installation often make the above described manual loading of the spring system inconvenient and undesirable. Thus there is need of an improved system for selectively tensioning the wind-up springs in spring-operated take-up reels or storage drums, particularly for electrical cables.

The present invention avoids the above-noted difficulties encountered in tensioning spring means by previously known reel structures and answers the long-felt need of an improved and simplified means for regulating spring systems in automatic spring-powered take-up reels. This is accomplished simply and directly by employing a uni-directional clutch means between the reel and the spring motor so that the latter is readily adapted to drive the reel in only one rotational direction for retrieving the payed-out cable while permitting relative movement in an opposite direction between the reel and its supporting shaft which is driven by the spring motor. Tensioning the wind-up spring without rotating the reel is then made possible by manually operated wrench means engageable with and adapted to rotate a hub element connecting one end of the spring means to the reel and clutch means. The reel thus may be held stationary and the spring means readily wound relative thereto by rotating the hub element appropriately to effect free wheeling operation of the clutch means. Accidental or intentional release of the wrench means does not cause reverse driving of the hub, since the uni-directional clutch means transmits the spring force in only one direction, namely, to drive the reel. If the latter is held, as aforesaid, no rotation of the hub results. Therefore, if the cable on the reel is held at one end by being attached to the motorized equipment, tension applied to the spring means through the wrench and clutch system increases tension of the cable, but does not rotate the cable reel until there is movement between the cable and reel. The basic and underlying principle of operation embodied in the present invention centers about utilization of relative movement between the take-up reel and its spring-operated motor and the control of such relative movement by means of a uni-directional clutch means.

Essentially the reel is permitted to rotate relative to the spring motor drive to pay-out cable, stored thereon while relative movement of the spring motor drive relative to the reel is also permitted. It is this latter relative movement that is employed by the present invention to effect selective tensioning of the spring motor means, as will appear from descriptive materials which follow.

The main object of this invention is to provide a new and improved spring powered automatic take-up reel for storing cable and the like.

A still further object of this invention is to provide a new and improved take-up reel including a spring-operated take-up motor, a cable storage reel, a uni-directional clutch means coupling the spring motor and reel for rotatably driving the latter in one direction by the spring motor while permitting relative rotational movement between the reel and spring motor in the opposite direction, and a means for driving the spring motor relative to the storage reel for selectively winding the spring means thereof.

A still additional object of this invention is to provide reel means for storing cable and the like, including a spring-actuated motor adapted to rotate the reel in a direction appropriate to retrieve or wind up cable payed out therefrom, and including means for selectively tensioning the take-up spring without rotating the storage reel.

The above and further objects, features and advantages of this invention will appear from the following written description of a preferred embodiment of the present invention illustrated in the accompanying drawings.

In the drawings:

FIG. 1 is a view in side elevation, with parts thereof broken away in section, to show the features of a typical cable storage reel having a spring operated take-up motor embodying the improved features of this invention; and FIG. 2 is a cross-sectional view taken substantially from vantage line 2—2 of FIG. 1 and looking in the direction of the arrows thereon, FIG. 2 being an enlarged scale over FIG. 1.

Turning now to the features of the take-up reel indicated generally by numeral 10 in FIG. 1 and the particulars of my improved invention embodied therein, it will be understood that the reel assembly 10 comprises a storage drum means 11 on which is stored a length of electrical cable 12, a spring motor means 13 and a collector assembly 14.

The drum assembly 11 includes a cylindrical core means 15, extending centrally between a pair of parallel spaced circular end disc members 16 and 17, one at either end of the drum core and coaxial therewith; said disc members 16 and 17 being welded or otherwise suitably affixed to the ends of the core member 15 as indicated by weld beads 18 shown in FIG. 1. The drum further is formed so that the end members 16 and 17 thereof extend radially outwardly of the cylindrical core member 15, to define a receptacle for storing a length of cable about the core 15, in a recognizedly familiar fashion. Tubular annular hoop elements 19—19 also are disposed in parallel spaced relation substantially in the planes of the two disc elements 16 and 17 and concentrically outwardly thereof to act as rub rails and guides protective of the cable 12 as it is payed out and taken in by the reel during operation. Said hoop elements 19—19 are held in fixed relation by suitable bracket means (not shown here).

The assembled drum is mounted on and fixed to a hollow shaft 20 having an enlarged cylindrical portion 21 adjacent one end thereof, about which the drum assembly 11 is mounted; plate 17, as seen in FIGURE 1, abutting one end of the shoulder portion 21 and plate 16 being disposed concentrically about the other end of the portion 21. The hollow shaft 20 extends for some distance axially outwardly of one end of the drum assembly 11 to support the collector assembly 14 about its one end, as will be described more fully hereinafter.

Located intermediate the ends of the hollow shaft 20 and between the collector assembly 14 and the drum assembly 11 is a ball bearing assembly 22 which supports shaft 20 for rotation.

The opposite end of shaft 20 terminates substantially flush or coplanar with the drum disc element 16 in the particular embodiment illustrated and such is counterbored at 23, with a diameter somewhat larger than the hollow central core 24 thereof. Counterbore 23 is adapted to receive one end of a driving stub shaft 25 to which it is affixed thereby by the key means 26. Thus the drive shaft 25 and the hollow shaft 20 are adapted for conjoint rotation, and are disconnectably related for disassembly of the take-up reel if desired.

A second ball bearing assembly 27, carried by the spring motor means 13 supports the stub shaft 25 and provides additional bearing support for the rotatable drum assembly 11.

In regard to the bearing assemblies 22 and 27, it will be understood that the bearing assembly 22 is carried in a suitable bearing bracket 28 mounted in an opening therefor formed in an upright frame member 30; bearing bracket 28 being bolted to the frame member 30 by stud bolts 31. Frame member 30 in turn is held to and is mounted across one or more metal mounting channel members 32 disposed at the base end of the assembly 10 and joined to the upright frame member 30 by foot brackets 33 and connecting bolt means 34.

Spaced parallel to frame 30, but at the opposite end of the drum assembly 11, is a second upright frame element comprising a back plate 35 which is joined to the mounting channel members 32 by additional foot brackets 36. Back plate 35 has an opening 37 formed therein for the passage of the stub drive shaft 25 and such carries a bearing housing 38 for containing and supporting the ball bearing assembly 27. To this end bearing housing 38 is affixed to one face of plate 35, concentrically of opening 37, as by plural screw members 40 or like means.

It will be recognized, therefore, that the bearing assemblies 22 and 27, which support the rotatable drum 11, are carried by a pair of spaced upright frame elements 30 and 35, as described. In order to give rigidity to the assembly, and particularly to maintain the frame elements 30 and 35 in desired space positions, one or more tie rod assemblies 41, including adjustable collar means 42 for adjusting the spacing between the two plate members 30 and 35 are provided.

Turning now to the features of the spring motor means 13, it will be understood that the same includes the bearing means 27 and the cap or housing 38 for such bearing means, as above described. As shown, the spring motor means 13 is located coaxially of and about the shaft 25 immediately adjacent the upright supporting frame member 35. More specifically, spring motor means 13 includes a substantially cylindrical spring housing formed by a cylindrical side wall member 45 welded to one face of the frame member 35 and projecting outwardly thereof, as shown best in FIGURE 1. A cover member 46 is held over the open end of such housing abutting the outer end of the wall portion 45 by plural holding bolt means 47 extending between plate member 35 and the cover member 46. Threaded nut means 48 or the like engage the threaded outer ends of the bolt members 47 and serve to hold the cover member 46 in place.

Coaxially of the substantially cylindrical spring housing so provided is a main body portion 50 of the stub shaft member 25 about which is mounted a substantially cylindrical spring hub member 51. A coil wind-up spring 52 is disposed in the annular space between the spring hub member 51 and the internal side walls of the housing member 45; the inner end thereof being anchored to the spring hub member 51 as by a holding screw 53. The opposite or outer end of the spring 52 is attached to the side wall portion 45 of the motor housing, as by bolt member 54 or other fastening device. With this arrangement it will be recognized readily that rotation of the spring hub member 51 in one direction will serve to tighten or wind up the spring means 52 while rotation thereof in an opposite direction serves to release spring tension. Conversely, the spring means 52 is adapted to rotate or drive the spring hub 51 in one direction to transmit its stored-up energy to the drive shaft 25. To this latter end a unique and simple uni-directional clutch system is employed, as will now be described.

As illustrated clearly in FIGURE 2 of the drawings, the stub shaft 25 has a pair of diametrically opposed keyways formed inwardly of its cylindrical surfaces, such keyways being numbered 55, 55. Each keyway as shown is formed to include four lengthwise surfaces, of which top and bottom surfaces 56 and 57 lie opposite and substantially parallel to one another, while additional surfaces 58 and 59 intersect one another intermediate the wall surfaces 56 and 57. It is further to be noted that the surfaces 58 of each cam keyway generates at an incline or away from the center of shaft 25 so that the intersection of surfaces 56 and 58 is at a greater radial distance from the center of shaft 25 than the intersection of surfaces 58 and 59. This provides a camming surface, as will appear presently.

Mounted in each cam keyway is a roller cam key or pawl member 60 comprising a cylindrical metal rod adapted to extend substantially the full length of its respectively associated cam keyway 55. The diameter of each pawl member 60 is such as to extend substantially between the intersection of the inclined surfaces 58 and 59 of the cam keyway and the outside surface of the shaft 25. Thus, when shaft 25 is inserted into the collar member 51, the pawl members 60, 60 ride freely in the lower end of their associated cam keyways, or that is, substantially opposite the intersection of surfaces 58 and 59, thereof. A pawl spring 60a comprising a flat leaf member with a central bowed portion is disposed between each pawl member 60 and bottom surface 57 of its associated cam kayway so as to urge the pawl member 60 toward surface 56 and along the slope of the radially outwardly inclining surface 58 thereof. This causes the pawl members to be thrown radially outwardly toward the exterior surface of the shaft member 25 so as to frictionally engage the internal surface 61 of the collar member 51. It will be recognized also that the greater the movement of the pawl member 60 toward the narrower end surface 56 of its keyway, the greater its outward radial throw to produce a binding engagement thereof with surface 61 of the collar member. Thus a wedge locking clutch system is provided which produces a necessary and required clutching and interlocking of the collar 51 and shaft 25 in response to the above described movement of the locking pawls 60 toward one end of their keyways. Reverse movement of the pawl members 60, however, toward the surface 57 of their keyways immediately withdraws the pawls from wedging or clutching engagement with the collar member to release shaft 25. Thus a simple and effective uni-directional clutch means is provided for transmitting rotational movement of the collar member 50 to the drum activating drive shaft 25.

It will be recognized that in addition to the pawl springs 60a, the relative rotational movement between the collar 50 and the shaft 25 produces clutching or releasing operation of the clutch means, as selected. Thus, if collar 50 rotates about shaft 25 counterclockwise as indicated by arrow A in FIG. 2, the cam pawls 60 roll toward the smaller ends of their related keyways to lock up the collar and shaft. Reverse movement of the collar, of course, produces movement of the cam keys toward the larger ends of the keyways to release the shaft. Similarly, rotation of the shaft 25 relative to collar 50 causes lock-up or release therebetween, depending on the sense of relative movement.

With this system, spring 52 constantly urges collar 51, according to arrow A in FIGURE 2, to lock up the same with shaft 25 and drive the same and the attached storing drum appropriately to retrieve cable previously unwound therefrom. Likewise, when cable is unwound from the storage drum, it is merely necessary to pull on the cable to rotate the drum assembly 11 in a clockwise sense, as viewed in FIGURE 2. This causes clockwise rotation of the drive shaft 25 (according to arrow $a'$), with the resulting relative movement of the shaft with respect to collar 51 producing a lock-up therebetween to drive the collar and wind up or tension the spring means 52. Thus in a normal operation of the take-up reel the outgoing or paying out movement of the cable from the reel serves to rotate the latter and the drive shaft 25 appropriately to produce clutching operation of the pawl members 60—60 and tension load the spring 52. When pulling load on the cable is released, movement of the collar 51 relative to the shaft 25, according to arrow A as hereinabove explained, interlocks or clutches the same with the shaft to provide the necessary retrieving or take-up of the cable storage reel.

Since the uni-directional clutch system above described permits relative rotational movement between the shaft 25 and the spring hub or collar 51, it will be readily understood that clutching activity between the collar and shaft 25 occurs either upon movement of shaft 25 in a clockwise direction, according to arrow $a'$ in FIGURE 2, or by movement of the collar 51 relative to the shaft 25, according to directional arrow A of FIGURE 2. This is all as above set forth. When the shaft 25 moves in such a manner, it drives the collar 50 appropriately to tension the spring 51 as above described. Conversely when the collar 51 is driven counterclockwise in response to the urging or tensioning of the spring 52 it also drives the shaft 25 in a counterclockwise sense, causing the drum assembly 11 to rotate in a like sense to retrieve the cable member.

As explained previously, occasion demands adjustment of the spring 52, particularly to increase its tension, due to the loss of calibration and value of the spring from normal wear and tear, stretch of the cable and for other reasons. In any event, such adjustable tensioning of the spring 52 without disconnecting the cable 12 from the storage reel in any manner is readily accomplished through the features of this invention by providing means for appropriately rotating the spring hub or collar 51 relative to shaft 25, that is to say, clockwise, as viewed in FIGURE 2. Means for so driving the collar 51 as selected comprises a pair of diametrically opposite end openings 63, 63 formed in end wall 64 of the collar 51. These openings each receive one of two pins 65 projecting outwardly on one face of a manually operated bar wrench 66. This wrench and its association with the collar 51 is shown by dotted lines in FIGURE 2 of the drawings. It will be recognized that if the wrench 66 or other suitable means of a like nature are employed to drive the collar 51 clockwise in FIGURE 2, the collar member will move relative to the shaft member 25, releasing the pawl members 60 from the collar by appropriately driving the same towards surfaces 57 of their respective cam keyways, and thereby permitting free rotational movement of the collar 51 about the shaft 25. This movement of collar 51 in a clockwise sense serves to drive the inner end of the spring 52 therewith to tension and load the same.

Immediately upon the release of the wrench means 66, either intentionally or accidentally, the load of the spring is not transmitted to the wrench as one might suspect from past spring wind-up systems employed in this art, but instead is transmitted directly to shaft 25 through the operation of the uni-directional clutch system, as above explained. This is so because any counterclockwise rotation of the collar means 51 causes a clutching operation of the pawl members 60 to lock up the collar and shaft 25 thereby to drive the storage drum assembly 11 in a counterclockwise direction as viewed from FIGURE 2, to retrieve previously payed-out cable or tension the latter. Obviously, if the payed-out end of the cable is coupled to a piece of equipment, retrieving movement of the drum in response to the action of the spring means 52 merely results in a build-up of tension on the cable. This of course protects the operator from any danger or damage which might result from his attempting to oppose the full load on the spring means 52 when releasing the wrench means 66. Thus the present invention provides a unique, convenient and extremely simple means for applying desired adjustment or torsional load to the return spring means 52 in accordance with the objectives outlined hereinabove, while fully protecting the operating personnel.

As mentioned previously, in addition to the drum assembly 11 and the spring motor assembly 13, the reel assembly 10 illustrated in the drawings includes a collector assembly 14. In brief, the collector assembly is housed within a protective cap or cover 70 carried on the end frame member 30 and includes a plurality of collector ring segments 71 separated by separator plates or insulating barrier members 72. Plural brush fingers 73 carry commutator brush means 74 adjacent the outer ends thereof; each engaging the conductive outer surface of a collector ring segment 71 according to recognized practice. Each collector ring 71, by known practice, also is connected by a collector wire or conductor 75 to one of the several conductors of the multi-conductor cable 12, as for example, conductor 76 of the four conductor cable 12 illustrated.

Cable 12 is made available for connection of its individual conductor cables to the collector wires or connectors 75 by reason of the hollow shaft 20 and particularly the bored-out interior 24 thereof through which it is trained as shown best in FIGURE 2. In order to permit the passage of the cable 12 from the drum assembly to the interior of the shaft 20, the latter is provided with a suitable opening 78 through which the cable 12 passes while a clamp 79 is preferably used to hold the cable 12 in place interiorly of the drum hub portion 15. Commutation between the collector rings 71 and the brush fingers 73 is by brush means 74 joined respectively to corresponding conductors of a suitable multiple conductor cable indicated generally at 80. For instance, the individual conductor elements 81 and 82 of cable 80 are connected one to each of the fingers 73 through connector terminals 83 as shown in FIG. 1. In this regard it will be understood that in the particular four conductor collector assembly 14 shown in FIG. 1 of the drawings, two of the brush assemblies 74 are disposed on opposite sides of the assembled collector rings.

From the foregoing, those familiar with the art will readily recognize the unique features and structural aspects of my present invention which mark the same apart from the prior art. It further is to be understood that while the present invention is illustrated in conjunction with a preferred embodiment thereof as appears illustrated in the accompanying drawings, numerous changes, modifications and substitutions of equivalents may be made in the particular described embodiment without necessarily de-

I claim:

1. In an automatic take-up means for a storage reel, powered by spring-activated motor means, the combination of shaft means supporting the storage reel for rotation, a hub member surrounding said shaft means and adapted to be rotatably driven in one direction by the spring motor means, uni-directional clutch means adapted to mechanically lock-up said hub member and shaft means to rotatably drive the reel in one direction in response to the driving action of the spring motor, and means for manually rotating said hub member in a direction releasing said clutch means to wind the spring motor without rotating said shaft means.

2. In an automatic take-up reel the combination comprising storage reel means, shaft means supporting said reel means for rotation, a hub member mounted on said shaft means for rotation thereabout, spring motor means connected to said hub member for rotatably driving the same in one direction, clutch means adapted to periodically interlock said shaft and said hub member for conjoint rotation in response to said driving the latter in one direction, and selectively operable means for rotatably driving said hub member relative to said shaft means to wind the drive spring system of said motor means.

3. The combination as set forth in claim 2 wherein said selectively operable means comprises wrench engaging portions of said hub member engageable by wrench means for manually rotating said hub member.

4. In an automatic take-up reel adapted to store a length of cable thereon and having a spring actuated motor means for rotating the reel in a direction appropriate to retrieve cable payed out therefrom, means for selectively tensioning the spring system of the spring-actuated motor means comprising, a shaft supported for rotation with and carrying the cable storage reel thereon, a cylindrical hub member rotatably mounted on said shaft, connection means between the said hub member and the spring-actuated motor means whereby the latter rotatably drives said hub member in one direction, clutch means operable to interlock said shaft and hub member for conjoint rotation in said one direction whereby the reel means is driven by the motor means in said one direction, said clutch means also being operable to couple said hub member to said shaft in response to rotation of the latter and said reel means in a direction opposite to said one direction and to uncouple the same in response to rotation of said hub member in said opposite direction and relative to said shaft, and means for manually rotating said hub member in said opposite direction and relative to said shaft whereby to selectively tension the said spring system of said motor means without rotating said shaft means and reel.

References Cited in the file of this patent

UNITED STATES PATENTS 1,110,061     Kienzle _____ Sept. 8, 1914

FOREIGN PATENTS 646,564     France _____ July 16, 1928